(12) United States Patent
Oyanagi

(10) Patent No.: US 6,536,891 B2
(45) Date of Patent: Mar. 25, 2003

(54) AQUEOUS PIGMENT-BASED INK SET

(75) Inventor: Takashi Oyanagi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/990,183

(22) Filed: Nov. 21, 2001

(65) Prior Publication Data

US 2002/0097308 A1 Jul. 25, 2002

(30) Foreign Application Priority Data

Nov. 21, 2000 (JP) ........................................ 2000-354539

(51) Int. Cl.[7] .................................................. B41J 2/01
(52) U.S. Cl. ...................................... 347/100; 347/101
(58) Field of Search ................................ 347/100, 101, 347/96, 95

(56) References Cited

U.S. PATENT DOCUMENTS

| | | | | |
|---|---|---|---|---|
| 5,622,549 A | * | 4/1997 | Yui et al. ..................... | 347/100 |
| 5,913,971 A | * | 6/1999 | Fujimatsu et al. ....... | 106/31.86 |
| 6,007,182 A | * | 12/1999 | Matsubara et al. ......... | 347/100 |
| 6,033,463 A | * | 3/2000 | Yui et al. .................. | 106/31.27 |
| 6,368,397 B1 | * | 4/2002 | Ichizawa et al. ......... | 106/31.65 |

FOREIGN PATENT DOCUMENTS

| | | | | |
|---|---|---|---|---|
| EP | 0879857 A2 | * | 11/1998 | .............. B41J/2/01 |

* cited by examiner

Primary Examiner—Hai Pham
Assistant Examiner—Manish S. Shah
(74) Attorney, Agent, or Firm—Ladas & Parry

(57) ABSTRACT

An ink set including at least two aqueous ink compositions each containing a dispersed pigment and a surfactant, the ink compositions including an ink composition having the lowest lightness and an ink composition having the highest lightness; wherein (1) the ink composition having the lowest lightness has a higher surface tension than those of other ink compositions; wherein (2) the ink composition having the highest lightness has a lower surface tension than those of other ink compositions; and wherein (3) the dispersed pigment contained in the ink composition having the lowest lightness and the dispersed pigment contained in the ink composition having the highest lightness are (3a) both anionic dispersed pigments or (3b) both cationic dispersed pigments, and the surfactants to be contained in the ink composition having the lowest lightness and in the ink composition having the highest lightness are specifically defined for each of cases (3a) and (3b).

20 Claims, No Drawings

AQUEOUS PIGMENT-BASED INK SET

FIELD OF THE INVENTION

This invention relates to an aqueous pigment ink set for ink jet recording. The aqueous pigment ink set of the invention effectively prevents blur or color bleeding, particularly at the boundary of different colors in color printing, and further prevents feathering, thus enabling to provide printed images with a high quality.

BACKGROUND OF THE INVENTION

In the case of printing a recording medium, called plain paper, according to an ink jet recording method using an aqueous pigment ink composition containing a pigment as a colorant, quick-drying properties and high color-developing properties are required. Thus, it is common to add a penetrating agent or a surfactant to the aqueous pigment-based ink compositions for the ink jet recording method. That is, addition of the penetrating agent serves to improve penetrating properties of the compositions, and addition of the surfactant serves to improve wetting properties of the compositions, thus changing the ink properties.

On the other hand, plain paper to be used as recording medium has varying surface state due to a difference in kind of a sizing agent, a difference in composition of pulp constituting the paper, or a difference in paper-making process. It has commonly been known that, due to the difference in the surface state of paper and the change in ink properties, printed letters or images might undergo color blur, a phenomenon that an ink spreads along the pulp fibers constituting the paper to generate beard-like streaks (feathering), or a phenomenon in a region where two or more color ink compositions are superposed one over the other, that the ink compositions are mutually mingled to make the boundary unclear (color bleeding).

As means for preventing the color blur, feathering or color bleeding, there have been made various approaches with respect to ink compositions.

For example, JP-A-7-145336 (The term "JP-A" as used herein means an "unexamined published Japanese patent application") proposes to reduce bleeding by the reaction between an anionic printing solution containing a polymer and a cationic printing solution. Addition of the polymer, however, largely increases viscosity of the ink even when the polymer is added only in a small amount, and hence it is difficult to use the ink for the ink jet recording method in which an ink composition having a viscosity in a comparatively low region (1 to 10 mPa.s) is used. In addition, when the addition amount of the polymer is smaller, the intended bleed-suppressing effect is insufficient, thus the object not being attained.

JP-A-7-150090 proposes a combination of a hydroxycarboxylic acid salt or a hydroxydicarboxylic acid salt and a particular anionic surfactant. However, existence of a free carboxylic acid in an aqueous ink involves the problem that ejection stability is deteriorated, causing dot curving problem of ink droplets.

JP-A-8-319442 proposes a technique of adding inorganic fine particles such as colloidal silica or synthetic zeolite to functionalize (specifically make thixotropic) rheology properties of an ink. However, the addition of the inorganic fine particles decreases fluidity of an ink, and therefore causes such problems as dot curving problem of ink droplets and clogging due to deposition of the particles at the nozzle opening. Additionally, even in the case of using organic fine particles or an organic/inorganic hybrid material, the same problem tends to occur where the concentration of solids in an ink is high.

In addition, JP-A-10-6493, JP-A-11-323225, JP-A-11-342635, JP-A-11-343440 and JP-A-11-349878 propose a technique of utilizing anion-cation electrostatic mutual action. In the technique described in these publications, however, there is involved a trouble that a coagulation reaction takes place due to the anion-cation electrostatic mutual action on a nozzle plate upon rubbing a nozzle plate by a cleaning blade in the case of cleaning a printing head, resulting in clogging of the nozzle. In order to avoid this trouble, it is necessary to separate the printing head into a head for an anionic ink and a head for a cationic ink and provide each of the heads with a separate cleaning mechanism, which imposes a mechanical burden and causes an increase in production cost.

In addition to the techniques of adding additives to an ink composition as described above, there has been proposed a technique of preventing color blur, feathering or color bleeding by using an ink composition and a reactant in combination.

For example, JP-A-9-239964 proposes a technique of using a reactant containing a coordination compound of a multi-valent metal. This is a technique of utilizing a coagulation reaction to be caused between a multi-valent metal ion (cation) and a dye having an anionic functional group. However, the multi-valent metal ion to be used in this technique as a reactant is an essentially unstable compound liable to separate out, and hence a reaction solution is previously prepared in which this ion is stably dissolved by forming its complex with a coordination compound and, upon printing, this reaction solution is brought into contact with an ink composition. Therefore, in case where the coordination state is destroyed by any reason, a metal compound separates out in the reaction solution and clogs piping or nozzles as insolubles.

Further, in the technique of using the aforesaid reactant, it is necessary to separate the printing head into a head for a reaction solution and a head for an ink composition and separately provide a cleaning mechanism for each of the heads, which imposes a burden of apparatus and causes an increase in production cost. In addition, it has been known that, in the case of conducting printing, reaction solution droplets are ejected onto a recording medium such as paper in addition to ink droplets, and hence an amount of water to be given to the recording medium is increased so much that there are involved problems that a prolonged drying time is required and that deformation of the recording medium, i.e., wrinkling or curling, takes place. In general, it is also known that, even when a highly reactive reaction is employed, an excess amount of water given to the recording medium would make it difficult to prevent color blur, feathering or color bleeding.

In the full color ink jet printing method using an aqueous pigment-based ink composition set, the color blur, feathering or color bleeding as described hereinbefore is observed seriously in the case of recording letters with a color having a low lightness such as black against the background of a color having a high lightness such as yellow at the boundary therebetween. Means for effectively preventing color blur, feathering or color bleeding under the condition where color blur, feathering or color bleeding becomes most conspicuous as described above have not so far been known.

SUMMARY OF THE INVENTION

Accordingly, an object of the present invention is to provide an aqueous pigment-based ink composition set for a color ink jet recording apparatus, which effectively prevents color blur, feathering or color bleeding even at the boundary between a color having a high lightness such as yellow and a color having a low lightness such as black, thereby enabling to produce recorded products with a high quality.

Other objects and effects of the present invention will become apparent from the following description.

The above-described objects of the present invention have been achieved by providing:

an ink set comprising at least two aqueous ink compositions each containing a dispersed pigment and a surfactant, said ink compositions including an ink composition having the lowest lightness and an ink composition having the highest lightness;

wherein (1) said ink composition having the lowest lightness has a higher surface tension than those of other ink compositions;

wherein (2) said ink composition having the highest lightness has a lower surface tension than those of other ink compositions; and wherein (3) the dispersed pigment contained in said ink composition having the lowest lightness and the dispersed pigment contained in said ink composition having the highest lightness are (3a) both anionic dispersed pigments or (3b) both cationic dispersed pigments, when condition (3a) is satisfied,
(3a-i) said ink composition having the lowest lightness contains an anionic surfactant, and said ink composition having the highest lightness contains an amphoteric surfactant, or
(3a-ii) said ink composition having the lowest lightness contains an amphoteric surfactant, and said ink composition having the highest lightness contains an anionic surfactant, and when condition (3b) is satisfied,
(3b-i) said ink composition having the lowest lightness contains a cationic surfactant, and said ink composition having the highest lightness contains an amphoteric surfactant, or
(3b-ii) said ink composition having the lowest lightness contains an amphoteric surfactant, and said ink composition having the highest lightness contains a cationic surfactant.

In a preferred embodiment, the ink composition having the lowest lightness is a black ink composition and/or the ink composition having the highest lightness is a yellow ink composition.

In another preferred embodiment, the dispersed pigment in the ink composition having the lowest lightness and the dispersed pigment in the ink composition having the highest lightness are both anionic dispersed pigments.

In a still other preferred embodiment, the anionic surfactant has a sulfonic acid group and/or the amphoteric surfactant has a sulfonic acid group.

In a still other preferred embodiment, the ink compositions, other than said ink composition having the highest lightness and said ink composition having the lowest lightness, each contain a nonionic surfactant.

In a still other preferred embodiment, the ink composition having the highest lightness has a surface tension of 20 mN/m or higher, and the ink composition having the lowest lightness has a surface tension of 50 mN/m or lower.

In a still other preferred embodiment, the ink set comprises a yellow aqueous ink composition, a cyan aqueous ink composition, a magenta aqueous ink composition and a black aqueous ink composition. In this case, it is further preferred that the yellow, cyan, magenta and black aqueous ink compositions have surface tensions satisfying the following relational expressions (1) and (2):

$$\gamma k > \gamma c > \gamma y \qquad (1)$$

$$\gamma k > \gamma m > \gamma y \qquad (2)$$

wherein $\gamma y$, $\gamma c$, $\gamma m$ and $\gamma k$ represent surface tensions of the yellow, cyan, magenta and black aqueous ink compositions, respectively. In a still further preferred embodiment, the following relational expressions (3) and (4) are satisfied:

$$20 \; mN/m \leq \gamma y \qquad (3)$$

$$\gamma k \leq 50 \; mN/m \qquad (4).$$

DETAILED DESCRIPTION OF THE INVENTION

The invention is described in detail below. An ink set of the invention comprising an arbitrary number of color ink compositions effectively prevents color blur, color bleeding and feathering which are caused between an ink composition having the lowest lightness and an ink composition having the highest composition. Therefore, ink compositions constituting the ink set of the invention are not particularly limited as to the kind and number thereof, but typical examples of the ink set of the invention include an ink set of four colors of yellow, cyan, magenta and black; an ink set of six colors of yellow, cyan, magenta, black, light cyan and light magenta; an ink set of seven colors of yellow, cyan, magenta, black, light cyan, light magenta and dark yellow; an ink set of seven colors of yellow, magenta, cyan, black, light black, light magenta and light cyan; an ink set of seven colors of yellow, cyan, magenta, black, red, green and blue; an ink set of seven colors of yellow, cyan, magenta, black, orange, green and blue; and an ink set of seven colors of yellow, magenta, cyan, black, orange, green and violet.

Additionally, in this specification, an ink composition of "light magenta" and an ink composition of "light cyan" are generally a magenta ink composition and a cyan ink composition, respectively, containing colorants in a low concentration for the purpose of modulating density to thereby improve image quality of printed images. In addition, an ink composition of "dark yellow" is a yellow ink composition containing a colorant (pigment) having a lower lightness and a lower chroma saturation than those of a yellow ink composition for the purpose of improving color reproducibility in shadow areas against dark color. And, each of "red", "orange", "green", "blue" and "violet" ink compositions are ink compositions to be used as elements of constituting intermediate colors between yellow, magenta and cyan for improving the range of color reproducibility. Further, an ink composition of "light black" is a black ink composition which has a lower concentration of a colorant (pigment) for the purpose of improving color reproducibility in shadow areas against dark color, improving gradation of gray and reducing graininess.

In an ink set, the combination showing the most conspicuous color blurring and color bleeding at the boundary between different colors is a combination of an ink composition having the highest lightness and an ink composition having the lowest lightness, among the ink compositions contained in each ink set, and color blurring or color bleeding occurring at the boundary between them is the most conspicuous. The invention can effectively prevent such most conspicuous color blurring or color bleeding.

In general, the ink composition having the lowest lightness in a full color ink set is a black ink composition. In addition, in a four-color ink set of yellow, cyan, magenta and black, the ink composition having the highest lightness is a yellow ink composition. In an ink set containing a light cyan composition and/or a light magenta composition in addition to the yellow composition, there may be the cases where the light cyan ink composition or the light magenta ink composition is the ink composition having the highest lightness.

In the ink set of the invention, all aqueous ink compositions that constitute the ink set contain a dispersed pigment and a surfactant.

Respective aqueous ink compositions constituting the ink set of the invention contain an anionic dispersed pigment or a cationic dispersed pigment as a dispersed pigment. In the ink set of the invention, the dispersed pigment in the ink composition having the lowest lightness (for example, a black ink composition) and the dispersed pigment in the ink composition having the highest lightness (for example, a yellow ink composition) are both anionic dispersed pigments or both cationic dispersed pigments. Preferably, the dispersed pigment in the ink composition having the lowest lightness (for example, a black ink composition) and the dispersed pigment in the ink composition having the highest lightness (for example, a yellow ink composition) are both anionic surfactants.

In the invention, the term "anionic dispersed pigment" means a pigment, an aqueous dispersion of which shows a negative zeta-potential ($\zeta$-potential) in a state where the pigment particles are stably dispersed in water. The term "cationic dispersed pigment" as used herein means a pigment, an aqueous dispersion of which shows a positive zeta-potential in a state where the pigment particles are stably dispersed in water. Additionally, the zeta-potential is a potential also referred to as interfacial electrokinetic potential. That is, an electric double layer is formed at the solid-liquid interface between pigment particles (solid) and an ink liquid phase (liquid) and, upon relative motion of the pigment particles (solid) and the ink liquid phase (liquid), a solid phase (or adsorption phase) neighboring the surface of the pigment particles moves together with the pigment particles. Accordingly, it is a potential difference between the solid phase and interior of the ink liquid phase (liquid) that controls the interfacial electrokinetic phenomenon upon the relative motion. This potential difference being referred to as zeta-potential.

The method to attain the state where the pigment particles are stably dispersed in water is not particularly limited and known methods can be used therefor. The pigment particles can be stably dispersed in water, for example, by the use of a resinous dispersing agent, by coating the pigment particles with a resin (i.e., a microcapsulated pigment), or by chemically modifying the particle surface to add a dispersibility-imparting group thereon (i.e., surface-treated pigment, which enables to provide an aqueous dispersion without using any dispersing agent). Examples of the resinous dispersing agent include natural polymers and synthetic polymers. Examples of the dispersibility-imparting agent include carboxyl group, carbonyl group, hydroxyl group and sulfo group.

The pigments for use in the invention are not particularly limited, and inorganic pigments or organic pigments may be used. The inorganic pigments include, for example, carbon black manufactured by a known method such as a channel method, a contact method, a furnace method or a thermal method, as well as titanium oxide and iron oxide. The organic pigments includes, for example, azo pigments (including azo lakes, insoluble azo pigments, condensed azo pigments and chelate azo pigments), polycyclic pigments (for example, phthalocyanine pigments, perylene pigments, perynone pigments, anthraquinone pigments, quinacridone pigments, dioxazine pigments, thioindigo pigments, isoindolinone pigments and quinophthalone pigments), dye chelates (for example, basic dye type chelates and acidic dye type chelate), nitropigments, nitroso pigments and aniline black. The above-illustrated pigments may be used singly or in combination of two or more thereof.

As an example of the anionic dispersed pigment for use in the invention, pigments which surface has been subjected to sulfonation treatment (i.e., sulfonated pigments) can be exemplified. Specific examples of the sulfonated pigment include, for example, those described in JP-A-11-246806.

Examples of the dispersibility-imparting group for attaining a cationic dispersed pigment include amino group, imino group, quaternary ammonium group and pyridinium group.

The average particle size of the dispersed pigment particles to be contained in each of the aqueous ink compositions constituting the ink set of the invention is not particularly limited, but ranges preferably from 50 to 500 nm, more preferably from 100 to 200 nm. In case where the average particle size exceeds 500 nm, there might result ejection failure. Additionally, in this specification, the term "average particle size" means a 50% average particle size value obtained by measuring the average particle size using a laser-Doppler particle size distribution meter (Microtrac UPA; made by Leeds & Northrup Instruments).

In each of the aqueous ink compositions constituting the ink set of the invention, the pigment concentration is not particularly limited, but is preferably 0.1 to 15% by weight, more preferably 2 to 10% by weight, based on the total weight of the respective aqueous ink composition. In case where the pigment concentration is less than 0.1% by weight, there might result insufficient color density whereas, in case where the pigment concentration exceeds 15% by weight, there might result ejection failure or decreased storage stability.

The anionic surfactant, cationic surfactant, amphoteric surfactant and nonionic surfactant for use in each of the aqueous ink compositions constituting the ink set of the invention, may be any known anionic surfactants, cationic surfactants, amphoteric surfactants and nonionic surfactants, respectively.

The anionic surfactant includes, for example, fatty acid salts, polyoxyethylene-added alkyl ether sulfates, α-olefinsulfonates, alkylbenzenesulfonates, alkylnaphthalenesulfonates, alkylsulfates, dialkylsulfosuccinates, monoalkyl phosphates and alkenylsuccinates. As the anionic surfactant, those anionic surfactants which contain a sulfonic acid group, such as α-olefinsulfonates, alkyl benzenesulfonates, alkylnaphthalenesulfonates or dialkylsulfosuccinates are preferably used.

The cationic surfactant includes, for example, dodecyltrimethylammonium chloride, hexadecyltrimethylammonium chloride and dihexadecyldimethylammonium bromide.

The amphoteric surfactant includes, for example, alkylcarboxybetaine, alkylsulfobetaine, 1-(3-sulfopropyl) pyridinium betaine, amidoamino acid salts and lecithin. As the amphoteric surfactant, those amphoteric surfactants which contain a sulfonic acid group, such as alkylsulfobetaines or 1-(3-sulfopropyl)pyridinium betaine are preferably used.

The nonionic surfactant includes, for example, polyoxyethylene alkyl ether, polyoxyethylene alkyl ester, polyoxyethylenesorbitan fatty acid ester, polyoxyethylene alkylphenyl ether, higher alcohol polyoxyethylene adduct, polyoxyethylene dialkyl ether, polyoxyethylene alkylamine, cellulose derivatives (e.g., hydroxyethyl cellulose, methyl cellulose, hydroxypropyl cellulose and methylhydroxyethyl cellulose), sorbitan alkyl ester, acetylene glycol (e.g., Olfin Y; Surfynol 82, 104, 440, 465 and 485; all of them being products of Air Products and Chemicals, Inc.).

In each of the aqueous ink compositions constituting the ink set of the invention, the amount of the surfactant contained in each ink composition is not particularly limited, but is preferably 0.01 to 5% by weight, more preferably 0.05 to 2% by weight, based on the total weight of the respective aqueous ink composition. In case where the amount of the contained surfactant is less than 0.01% by weight, there results insufficient surface active effect, whereas in case where the amount exceeds 5% by weight, there might result precipitation of crystals, formation of liquid crystal or reduction in stability, causing ejection failure.

Each of the aqueous ink compositions constituting the ink set of the invention may contain a water-soluble organic solvent as a wetting agent, a drying rate-adjusting agent and/or a stabilizing agent. In each of the aqueous ink compositions constituting the ink set of the invention, the amount of the water-soluble organic solvent is preferably 0.5 to 40% by weight, more preferably 2 to 30% by weight, based on the total weight of the respective aqueous ink composition.

The water-soluble organic solvent may be those water-soluble organic solvents which are used in common aqueous pigment-based ink compositions, and specific examples thereof include polyhydric alcohols such as ethylene glycol, diethylene glycol, triethylene glycol, tetraethylene glycol, polyethylene glycol, polypropylene glycol, propylene glycol, dipropylene glycol, butylene glycol, 1,2,6-hexanetriol, thioglycol, hexylene glycol, glycerol, trimethylolethane and trimethylolpropane; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether and triethylene glycol monobutyl ether; 2-pyrrolidone; N-methyl-2-pyrrolidone; 1,3-dimethyl-2-imidazolidinone and triethanolamine.

In the ink set of the present invention, the dispersed pigment contained in the ink composition having the lowest lightness (for examples, a black ink composition) and the dispersed pigment contained in the ink composition having the highest lightness (for example, a yellow ink composition) are (3a) both anionic dispersed pigments or (3b) both cationic dispersed pigments.

In the case where condition (3a) is satisfied, one of the following conditions (3a-i) and (3a-ii) should be satisfied.

(3a-i) The ink composition having the lowest lightness (for example, a black ink composition) contains an anionic surfactant, and the ink composition having the highest lightness (for example, a yellow ink composition) contains an amphoteric surfactant.

(3a-ii) The ink composition having the lowest lightness (for example, a black ink composition) contains an amphoteric surfactant, and the ink composition having the highest lightness (for example, a yellow ink composition) contains an anionic surfactant.

In the case where condition (3b) is satisfied, one of the following conditions (3b-i) and (3b-ii) should be satisfied.

(3b-i) The ink composition having the lowest lightness (for example, a black ink composition) contains a cationic surfactant, and the ink composition having the highest lightness (for example, a yellow ink composition) contains an amphoteric surfactant, or (3b-ii) The ink composition having the lowest lightness (for example, a black ink composition) contains an amphoteric surfactant, and the ink composition having the highest lightness (for example, a yellow ink composition) contains a cationic surfactant.

In a preferred embodiment of the ink set of the invention, the ink composition having a lowest lightness is a black ink composition, and the ink composition having the highest lightness is a yellow ink composition.

In the case where the ink set of the invention comprises an ink composition having the lowest lightness (for example, a black ink composition), an ink composition having the highest lightness (for example, a yellow ink composition), and one or more ink compositions each having an intermediate lightness therebetween (for example, a cyan aqueous ink composition and a magenta aqueous ink composition), it is preferred that a dispersed pigment contained in the ink composition having the lowest lightness (for example, a black ink composition), a dispersed pigment contained in the ink composition having the highest lightness (for example, a yellow ink composition), and pigments respectively contained in the ink compositions each having an intermediate lightness therebetween (for example, a cyan aqueous ink composition and a magenta aqueous ink composition) are (3a') all anionic dispersed pigments or (3b') all cationic dispersed pigments.

In the case where condition (3a') is satisfied, it is preferred to satisfy one of the following conditions (3a'-i) and (3a'-ii).

(3a'-i) The ink composition having the lowest lightness (for example, a black ink composition) contains an anionic surfactant, the ink composition having the highest lightness (for example, a yellow ink composition) contains an amphoteric surfactant, and the ink compositions having an intermediate lightness therebetween (for example, a cyan aqueous ink composition and a magenta aqueous ink composition) contain a nonionic surfactant.

(3a'-ii) The ink composition having the lowest lightness (for example, a black ink composition) contains an amphoteric surfactant, the ink composition having the highest lightness (for example, a yellow ink composition) contains an anionic surfactant, and the ink compositions having an intermediate lightness therebetween (for example, a cyan aqueous ink composition and a magenta aqueous ink composition) contain a nonionic surfactant.

In the case where condition (3b') is satisfied, it is preferred to satisfy one of the following conditions (3b'-i) and (3b'-ii).

(3b-i) The ink composition having the lowest lightness (for example, a black ink composition) contains a cationic surfactant, the ink composition having the highest lightness (for example, a yellow ink composition) contains an amphoteric surfactant, and the ink compositions having an intermediate lightness therebetween (for example, a cyan aqueous ink composition and a magenta aqueous ink composition) contain a nonionic surfactant.

(3b-ii) The ink composition having the lowest lightness (for example, a black ink composition) contains an amphoteric surfactant, the ink composition having the highest lightness (for example, a yellow ink composition) contains a cationic surfactant, and the ink compositions having an intermediate lightness therebetween (for example, a cyan aqueous ink composition and a magenta aqueous ink composition) contain a nonionic surfactant.

From the point of adjusting the surface tension, it is preferred to incorporate a nonionic surfactant in ink compositions having an intermediate lightness (for example, a cyan aqueous ink composition and a magenta aqueous ink composition) as described above because of the following reasons. That is, since a number of chemically synthesized nonionic surfactants are marketed, nonionic surfactants having various properties are easily available. In addition, it is easy to design an appropriate molecule (for example, properties of nonionic surfactants having a polyoxyethylene chain can be changed stepwise by changing the length of the polyoxyethylene moiety).

From the point of dispersion stability upon adding a surfactant and color-developing properties upon printing, both of the dispersed pigment contained in the black ink composition and the dispersed pigment in the yellow ink composition of the ink set of the invention are preferably anionic dispersed pigments. It is preferred, from the points of production cost or production process, color-developing properties upon printing and optical density of printed products, that dispersed pigments contained in all ink compositions constituting the ink set of the invention are anionic dispersed pigments. Additionally, in case where even one color ink composition containing a cationic dispersed pigment is employed in an anionic dispersed pigment-based ink set, agglomeration reaction occurs on a nozzle plate of a printing head during a cleaning process due to anion-cation electrostatic mutual action, and printing failure due to deposition of an agglomerate, that is, dot curving problem or clogging of nozzles, occurs. Therefore, there arise the disadvantages that a printing head must be separated into a head for an anionic ink and a head for a cationic ink and that cleaning mechanism is also required for each of the heads.

In the ink set of the invention, the anionic surfactants and the amphoteric surfactants to be used preferably have a sulfonic acid group from the points of printing stability and storage stability.

In each of the aqueous ink compositions constituting the ink set of the invention, the surface tension value of each of the ink composition is not particularly limited, but is preferably in the range of from 20 to 50 mN/m, more preferably from 25 to 40 mN/m. In case where the surface tension is less than 20 mN/m, there might result ejection failure, whereas more than 50 mN/m, there might result deterioration of image quality due to insufficient penetrating properties into a recording medium.

As has been described hereinbefore, in the ink set of the invention:

(1) an ink composition having the lowest lightness (e.g., a black ink composition) has a higher surface tension than any other ink compositions; and (2) an ink composition having the highest lightness (e.g., a yellow ink composition) has a lower surface tension than any other ink compositions.

Reasons for setting the surface tension of the ink composition having the lowest lightness (e.g., a black ink composition) to be higher than the surface tensions of any other ink compositions are described later.

By making the surface tension of the ink composition having the highest lightness (e.g., a yellow ink composition) lower than the surface tensions of any other ink compositions, invasion of other color inks into the yellow ink becomes difficult.

Accordingly, in a preferred ink set of the invention, even an ink composition having the highest lightness (e.g., a yellow ink composition) has a surface tension of 20 mN/m or more, and even an ink composition having the lowest lightness (e.g., a black ink composition) has a surface tension of 50 mN/m or less.

In the case where the ink set of the invention comprises, for example, ink compositions of four colors of yellow, cyan, magenta and black, it is preferred that the surface tension of the yellow aqueous ink composition ($\gamma y$), the surface tension of the cyan aqueous ink composition ($\gamma c$), the surface tension of the magenta aqueous ink composition ($\gamma m$) and the surface tension of the black aqueous ink composition ($\gamma k$) satisfy the following relational expressions (1) and (2):

$$\gamma k > \gamma c > \gamma y \quad (1); \text{ and}$$

$$\gamma k > \gamma m > \gamma y \quad (2).$$

In each of the aqueous ink compositions constituting the ink set of the invention, the viscosity of each ink composition is not particularly limited, but is preferably in the range of from 2 to 10 mPa.s, more preferably from 3 to 7 mPa.s. In case where the ink viscosity is less than 2 mpa.s, there might result deterioration of printing quality or printing stability, whereas more than 10 mPa.s, there might result difficult ink ejection.

The ink set of the invention can be used for various color printing methods. For example, it is preferably used for an ink jet recording method, more preferably, used for an ink jet recording method utilizing a driving pressure of a piezoelectric element. Further, it is particularly preferred to use the ink set for an on-demand ink jet recording method in which an ink is ejected only upon conducting printing.

By the use of the ink set of the invention, there is obtained a high-quality image with causing no color blur, feathering or color bleeding upon printing on a liquid-absorbing recording medium such as paper. In particular, in the printing where a black color invades into other colors, it is made possible to print images with no color blur, color bleeding and feathering.

Reasons for such excellent advantages are not at present clear, but it may be possible to reason as follows. However, the invention is not limited by the following reasoning. Additionally, the following reasoning is given by reference to the case of a color ink set of the invention wherein a dispersed pigment contained in a black ink composition having the lowest lightness and a dispersed pigment contained in a yellow ink composition having the highest lightness are both anionic dispersed pigments, the black ink composition contains an amphoteric surfactant, and the yellow ink composition contains an anionic surfactant.

First, in the ink set of the invention, a black ink composition is the most difficult to wet-spread along the fibers of paper, because the black ink composition is designed to have the highest surface tension. Therefore, in the case of conducting printing on a recording medium using an ink set of the invention, the black ink composition difficultly invades into other color ink compositions in a region where the black ink composition is in contact with other ink composition. However, only with this function due to the surface tension, invasion by the ink might occur with the lapse of time or by environmental influences (i.e., influences by temperature and humidity). In particular, the black ink composition has such a low lightness that it tends to become conspicuous when invading into other colors. Thus, it is desired to further provide some means for preventing color blur, color bleeding and feathering in addition to the function based on the surface tension.

As such means, in the present invention, an amphoteric surfactant is added to the black ink, and an anionic surfactant is added to the yellow ink. The amphoteric surfactant in the black ink causes a thickening action when associating with the anionic surfactant in the yellow ink. This thickening action is caused by association of a cationic functional group which is one of the polar groups of the amphoteric surfactant with an anionic functional group which is a hydrophilic group of the anionic surfactant due to electrostatic mutual action at the interface where the inks come into contact with each other. This thickening action prevents the colorant of pigment particles from migration and, as a result, color blur, color bleeding and feathering are prevented. Further, an increase in viscosity proceeds with the lapse of time after conducting printing due to evaporation or diffusion of moisture contained in the ink. Therefore, migration of pigment particles is further depressed and, when drying proceeds completely, the pigment particles are adsorbed on paper to fix. Thus, even when environmental change (i.e., an increase in humidity) takes place, the colorant does not migrate, and color blur, color bleeding and feathering do not occur.

Additionally, in the conventional technique wherein direct anion-cation agglomeration reaction of pigment particles is utilized, it has been necessary to separately dispose a head for a cationic black ink and a head for anionic yellow ink so that the black ink and the yellow ink do not come into contact with each other on a nozzle plate and initiate agglomeration reaction to cause clogging of the printing head. On the other hand, according to the ink set of the invention, it is not necessary to separately dispose a head for a black ink and a head for a yellow ink.

This is because, in the conventional technique, there has been employed a mechanism of agglomerating pigment particles by reacting pigment particles having a negative (anionic) or positive (cationic) charge in water with a compound having a charge reverse to that of the pigment particles, to electrostatically neutralize the charge on the pigment particles. In contrast, in the ink set of the invention, an amphoteric surfactant having both an anionic functional group and a cationic functional group within the molecule is contained in a black ink composition. Generally, when the number of anionic functional groups within molecule of a certain compound is the same as the number of cationic functional groups therein, the compound can be regarded as electrostatically neutral. Such an electrostatically neutral compound (e.g., an amphoteric compound) can increase the charge density on the surface of pigment particles having a negative (anionic) or positive (cationic) charge in water, but does not show the function of agglomerating the pigment particles.

Upon conducting printing using the ink set of the invention, when an aqueous pigment-based ink composition (e.g., a black ink composition) containing an amphoteric surfactant comes into contact with an aqueous pigment-based ink composition containing an anionic surfactant (e.g., a yellow ink composition) at a printing boundary, the cationic functional group which is one of the polar groups of the amphoteric surfactant associates with the anionic functional group which is a hydrophilic group of the anionic surfactant due to electrostatic interaction to form a mild network structure involving the pigment particles. This phenomenon is observed as an increase in viscosity. As is different from the anion-cation electrostatic neutralization reaction, this increase in viscosity is not based on rapid agglomeration. Therefore, even when the black ink composition and the yellow ink composition are brought into contact with each other to mix by some cause, there do not occur clogging of a nozzle and the dot curving problem due to deposition of agglomerates, and the mixture can easily be removed by the common cleaning operation. These points have been confirmed by experiments of the inventors. That is, the thickening reaction of the invention due to molecular association exhibits a large effect only when the amount of water in the ink solution is reduced and, unless drying by evaporation or diffusion of moisture proceeds, there arise no inconveniences in the printing process.

As has been described hereinbefore, in the ink set of the invention, even when letters are recorded using a color with a low lightness such as black on a background comprising a color with a high lightness such as yellow, color blur or color bleeding is depressed at the boundary between yellow and black due to thickening of the ink compositions. Further, by adjusting the surface tension of the ink composition having the lowest lightness (e.g., a black ink composition) to be higher than those of any other ink compositions, the penetrating rate of the black ink into a recording medium is delayed, thus the aforesaid color blur or color bleeding being depressed.

The present invention will be illustrated in greater detail with reference to the following Examples, but the invention should not be construed as being limited thereto. In the following Examples and Comparative Examples, the term "wt %" represents "% by weight".

EXAMPLE 1

(1) Procedure of Preparing Ink Compositions

Four kinds of ink compositions comprising the following formulations were prepared. Preparation was conducted according to the following procedure. That is, a pigment, a dispersing agent and water were mixed with each other, and dispersed for 2 hours in a sand mill (manufactured by Yasukawa Seisakusho) together with glass beads (diameter: 1.7 mm; amount: 1.5 times (by weight) as much as that of the mixture). Subsequently, the glass beads were removed to obtain a pigment dispersion.

Then, the following ingredients except for the pigment and the dispersing agent were mixed to prepare an ink solvent, followed by gradually dropwise adding the resultant ink solvent to the above-described pigment dispersion and stirring the mixture for 20 minutes at a room temperature. Thereafter, the mixture was filtered through a 5-um membrane filter to obtain an ink composition for ink jet recording.

(2) Formulation of a Black Pigment-Based Ink Composition

| | |
|---|---|
| Carbon Black MA-7 (colorant; made by Mitsubishi Chemical Corp.) | 5 wt % |
| Styrene-acrylic acid copolymer (dispersing agent) | 1 wt % |
| Glycerol | 10 wt % |
| Dodecyldimethyl (3-sulfopropyl) - ammonium (amphoteric ssurfactant; made by Sigma-Aldrich Inc.) | 1 wt % |
| Deionized water | balance |

(3) Formulation of Color Ink Set
(3a) Formulation of a Cyan Pigment-Based Ink Composition

| | |
|---|---|
| C.I. Pigment Blue 15:3 (colorant) | 2 wt % |
| Styrene-acrylic acid copolymer dispersing agent) | 1 wt % |

-continued

| | |
|---|---|
| Diethylene glycol | 10 wt % |
| Surfynol 465 (nonionic surfactant; made by Air Product and Chemicals, Inc.) | 1 wt % |
| Deionized water | balance |

(3b) Formulation of a Magenta Pigment-Based Ink Composition:

| | |
|---|---|
| C.I. Pigment Red 122 (colorant) | 3 wt % |
| Styrene-acrylic acid copolymer dispersing agent) | 1 wt % |
| Glycerol | 5 wt % |
| Diethylene glycol | 5 wt % |
| Surfynol 465 (nonionic surfactant; made by Air Product and Chemicals, Inc.) | 1 wt % |
| Deionized water | balance |

(3c) Formulation of a Yellow Pigment-Based Ink Composition

| | |
|---|---|
| C.I. Pigment Yellow 74 (colorant) | 3.5 wt % |
| Styrene-acrylic acid copolymer dispersing agent) | 1 wt % |
| Glycerol | 8 wt % |
| Sodium dioctylsulfosuccinate (anionic surfactant; made by Nakarai Tesc Co.) | 3 wt % |
| Deionized water | balance |

(4) Physical Properties of Respective Ink Compositions (4a) Surface Tension:

The surface tension of each of the ink compositions was measured by a tensiometer (automatic tensiometer, model CBVP-Z; made by Kyowa Kaimen Kagaku).

(4b) Ink Viscosity:

The ink viscosity of each of the ink compositions constituting the ink set of Example 1 was measured by a vibration type viscometer (VM-100; made by Yamaichi Denki).

(4c) Average Particle Size:

The average particle size of the pigment contained in each of the ink compositions constituting the ink set of Example 1 is a 50% average particle size (unit=nm) determined by measuring an average particle size using a laser-Doppler type particle size distribution meter (Microtrac UPA; made by Leed & Northrup Instruments).

The results of measuring each of the ink compositions constituting the ink set of Example 1 are shown in the following Table 1.

TABLE 1

| | Surface Tension (mN/m) | Ink Viscosity (mPa · s) | Average Particle Size (nm) |
|---|---|---|---|
| Yellow ink composition | 26 | 6.2 | ≦100 |
| Magenta ink composition | 30 | 3.6 | ≦100 |
| Cyan ink composition | 31 | 3.7 | ≦100 |
| Black ink composition | 33 | 4.4 | 100 |

EXAMPLE 2

(1) Procedure of Preparing Ink Compositions

A black ink composition comprising the following formulation was prepared according to the procedure described in Example 1 (1).

(2) Formulation of a Black Pigment-Based Ink Composition

| | |
|---|---|
| Carbon Black MA-7 (colorant; made by Mitsubishi Chemical Corp.) | 5 wt % |
| Styrene-acrylic acid copolymer (dispersing agent) | 1 wt % |
| Glycerol | 10 wt % |
| Octyldimethyl (3-sulfopropyl) - ammonium (amphoteric surfactant; made by Sigma-Aldrich Inc.) | 1 wt % |
| Deionized water | balance |

(3) Formulation of Other Ink Compositions

A cyan pigment-based ink, a magenta pigment-based ink and a yellow pigment-based ink having respectively the same formulations as described in (3a), (3b) and (3c) in the foregoing Example 1 were prepared.

(4) Physical Properties of Respective Ink Compositions

The surface tension, ink viscosity and average particle size of the black pigment-based ink composition were measured according to the same methods as described in (4a), (4b) and (4c) in Example 1. The physical properties of each of the ink compositions constituting the ink set of Example 2 are shown in the following Table 2. Additionally, the physical properties of the cyan pigment-based ink, the magenta pigment-based ink and the yellow pigment-based ink given in Table 1 are shown in Table 2 again.

TABLE 2

| | Surface Tension (mN/m) | Ink Viscosity (mPa · s) | Average Particle Size (nm) |
|---|---|---|---|
| Yellow ink composition | 26 | 6.2 | ≦100 |
| Magenta ink composition | 30 | 3.6 | ≦100 |
| Cyan ink composition | 31 | 3.7 | ≦100 |
| Black ink composition | 34 | 4.2 | ≦100 |

EXAMPLE 3

(1) Procedure of Preparing Ink Compositions

A yellow pigment-based ink composition comprising the following formulation was prepared according to the procedure described in Example 1 (1).

(2) Formulation of a Yellow Pigment-Based Ink Composition

| | |
|---|---|
| C.I. Pigment Yellow 74 (colorant) | 3.5 wt % |
| Styrene-acrylic acid copolymer (dispersing agent) | 1 wt % |
| Glycerol | 8 wt % |
| Sodium dihexylsulfosuccinate (anionic surfactant; made by Fluka Chemika) | 3 wt % |
| Deionized water | balance |

(3) Formulation of Other Ink Compositions

A black pigment-based ink, a cyan pigment-based ink and a magenta pigment-based ink having respectively the same formulations as described in (2), (3a) and (3b) in the foregoing Example 1 were prepared.

(4) Physical Properties of Respective Ink Compositions

The surface tension, ink viscosity and average particle size of the yellow pigment-based ink composition were measured according to the same methods as described in (4a), (4b) and (4c) in Example 1.

The physical properties of each of the ink compositions constituting the ink set of Example 3 are shown in the following Table 3. Additionally, the physical properties of the black pigment-based ink, the cyan pigment-based ink and the magenta pigment-based ink given in Table 1 are shown in Table 3 again.

TABLE 3

| | Surface Tension (mN/m) | Ink Viscosity (mPa · s) | Average Particle Size (nm) |
|---|---|---|---|
| Yellow ink composition | 29 | 4.7 | ≦100 |
| Magenta ink composition | 30 | 3.6 | ≦100 |
| Cyan ink composition | 31 | 3.7 | ≦100 |
| Black ink composition | 33 | 4.4 | ≦100 |

COMPARATIVE EXAMPLE 1

(1) Procedure of Preparing Ink Compositions

A black ink composition comprising the following formulation was prepared according to the procedure described in Example 1 (1).

(2) Formulation of a Black Pigment-Based Ink Composition

| | |
|---|---|
| Carbon Black MA-7 (colorant; made by Mitsubishi Chemical Corp.) | 5 wt % |
| Styrene-acrylic acid copolymer (dispersing agent) | 1 wt % |
| Glycerol | 10 wt % |
| Surfynol 465 (nonionic surfactant; made by Air Product and Chemicals, Inc.) | 1 wt % |
| Deionized water | balance |

(3) Physical Properties of Respective Ink Compositions

The surface tension, ink viscosity and average particle size of the black pigment-based ink composition were measured according to the same methods as described in (4a), (4b) and (4c) in Example 1. The results are shown in Table 4 below. Additionally, the ink set of this Comparative Example 1 contained a black pigment-based ink composition prepared in this Comparative Example 1 as a black pigment-based ink composition, with other ink compositions being the same as those described in Example 1.

TABLE 4

| | Surface Tension (mN/m) | Ink Viscosity (mPa · s) | Average Particle Size (nm) |
|---|---|---|---|
| Black ink composition | 30 | 3.9 | ≦100 |

COMPARATIVE EXAMPLE 2

(1) Procedure of Preparing Ink Compositions

A yellow pigment-based ink composition comprising the following formulation was prepared according to the procedure described in Example 1 (1).

(2) Formulation of a Yellow Pigment-Based Ink Composition

| | |
|---|---|
| C.I. Pigment Yellow 74 (colorant) | 3.5 wt % |
| Styrene-acrylic acid copolymer (dispersing agent) | 1 wt % |
| Glycerol | 8 wt % |
| Surfynol 465 (nonionic surfactant; made by Air Product and Chemicals, Inc.) | 3 wt % |
| Deionized water | balance |

(4) Physical Properties of Yellow Pigment-Based Ink Compositions

The surface tension, ink viscosity and average particle size of the yellow pigment-based ink composition were measured according to the same methods as described in (4a), (4b) and (4c) in Example 1. The results are shown in Table 5 below. Additionally, the ink set of this Comparative Example 2 contained a yellow pigment-based ink composition prepared in this Comparative Example 2 as a yellow pigment-based ink composition, with other ink compositions being the same as those described in Example 1.

TABLE 5

| | Surface Tension (mN/m) | Ink Viscosity (mPa · s) | Average Particle Size (nm) |
|---|---|---|---|
| Yellow ink composition | 30 | 4.1 | ≦100 |

COMPARATIVE EXAMPLE 3

(1) Procedure of Preparing Ink Compositions

The following dye was added to an ink solvent, and stirred for 20 minutes at a room temperature to dissolve. The resultant solution was filtered through a 5-μm membrane filter to obtain an ink composition for ink jet recording.

(2) Formulation of a Black Dye-Based Ink Composition

| | |
|---|---|
| Project Fast Black 2 (colorant; made by AVECIA) | 5 wt % |
| Glycerol | 10 wt % |
| Surfynol 465 (nonionic surfactant; made by Air Product and Chemicals, Inc.) | 1 wt % |
| Triethylene glycol monobutyl ether | 7 wt % |
| Deionized water | balance |

(3) Physical Properties of the Black Dye-Based Ink Composition

The surface tension, ink viscosity and average particle size of the black dye-based ink composition were measured according to the same methods as described in (4a), (4b) and (4c) in Example 1. The results are shown in Table 6 below. Additionally, the ink set of Comparative Example 3 contained a black dye-based ink composition prepared in this Comparative Example 3 as a black pigment-based ink composition, with other ink compositions being the same as those described in Example 1.

TABLE 6

|  | Surface Tension (mN/m) | Ink Viscosity (mPa · s) | Average Particle Size (nm) |
|---|---|---|---|
| Black ink composition | 32 | 3.9 | — |

COMPARATIVE EXAMPLE 4

(1) Procedure of Preparing Ink Compositions

Two kinds of ink compositions respectively comprising the following formulations were prepared according to the procedure described in Example 1 (1).

(2) Formulation of a Black Pigment-Based Ink Composition

| | |
|---|---|
| Carbon Black MA-7 (colorant; made by Mitsubishi Chemical Corp.) | 5 wt % |
| Styrene-acrylic acid copolymer (dispersing agent) | 1 wt % |
| Glycerol | 10 wt % |
| Sodium dioctylsulfosuccinate (anionic surfactant; made by Nakarai Tesc Co.) | 3 wt % |
| Deionized water | balance |

(3) Formulation of a Yellow Pigment-Based Ink Composition

| | |
|---|---|
| C.I. Pigment Yellow 74 (colorant) | 3.5 wt % |
| Styrene-acrylic acid copolymer dispersing agent) | 1 wt % |
| Glycerol | 8 wt % |
| Dodecyldimethyl (3-sulfopropyl) ammonium (amphoteric surfactant; made by Sigma-Aldrich Inc.) | 1 wt % |
| Deionized water | balance |

(4) Physical Properties of Respective Ink Compositions

The surface tension, ink viscosity and average particle size of the black pigment-based ink composition and the yellow pigment-based ink composition were measured according to the same methods as described in (4a), (4b) and (4c) in Example 1. The results are shown in Table 7 below. Additionally, the ink set of Comparative Example 4 contained the black pigment-based ink composition and the yellow pigment-based ink composition prepared in this Comparative Example 4 as a black ink composition and a yellow ink composition, respectively, with other ink compositions being the same as those described in Example 1. In Table 7, physical properties of the cyan pigment-based ink and the magenta pigment-based ink are the same as shown in the foregoing Table 1.

TABLE 7

|  | Surface Tension (mN/m) | Ink Viscosity (mPa · s) | Average Particle Size (nm) |
|---|---|---|---|
| Yellow ink composition | 33 | 4.1 | ≦100 |
| Magenta ink composition | 30 | 3.6 | ≦100 |
| Cyan ink composition | 31 | 3.7 | ≦100 |
| Black ink composition | 31 | 4.7 | ≦100 |

EVALUATION TESTS (1) Printing Method:

Printing was conducted on a recording medium of plain paper by means of an ink jet printer (manufactured by Seiko Epson Co., Ltd.; Ink Jet Printer EM-900C) using each of the ink sets prepared in Examples 1 to 3 and Comparative Examples 1 to 4.

After completion of the printing, the printed products were air-dried, and subjected to the following evaluation tests in the areas where the yellow ink composition and the black ink composition were printed one over the other.

(2) Recording Medium:

As recording media, the following three kinds of plain paper were used.

Recording medium 1: plain paper
Xerox P (made by Xerox Corp.)
Recording medium 2: plain paper
Xerox 4024 (made by Xerox Corp.)
Recording medium 3: plain paper
Upper grade plain paper (made by Seiko Epson Co., Ltd.; Model Number: KA425ONP)

(3) Evaluation Item 1 (Evaluation on Color Blur After Printing):

Printed products were evaluated with respect to blur immediately after printing according to the following four grades.

A: A blur-free good image was obtained.
B: A slight blur was formed.
C: Beard-like blur was formed.
D: Blurring occurred to such a degree that color boundary was not clear.

(4) Evaluation Item 2 (EVALUATION on Color Bleeding After Printing):

Printed products were evaluated visually for uneven color mixing at the color boundary according to the following four grades.

A: A good image with no color mixing was obtained.
B: Slight color mixing was observed.
C: Color mixing was observed.
D: Color mixing was observed to such a degree that color boundary was not clear.

(5) Evaluation Item 3 (Evaluation on Feathering After Printing):

Printed products were visually evaluated according to the following 4 grades whether beard-like blurring was formed or not.

A: A good image with no beard-like blurring was obtained.
B: Beard-like blurring was slightly formed.
C: Beard-like blurring was observed.
-: Evaluation wass unable to be evaluated due to the influence of color bleeding.

(6) Results:

The results of the evaluations are shown in the following Table 8.

TABLE 8

| Recording medium | Evaluation Item 1 | | | Evaluation Item 2 | | | Evaluation Item 3 | | |
|---|---|---|---|---|---|---|---|---|---|
| | 1 | 2 | 3 | 1 | 2 | 3 | 1 | 2 | 3 |
| Example 1 | A | A | A | A | A | A | A | A | A |
| Example 2 | A | B | A | A | A | A | A | B | A |
| Example 3 | A | B | A | A | A | A | B | B | A |
| Comparative Example 1 | B | B | A | A | B | A | B | B | B |
| Comparative Example 2 | C | C | B | B | C | B | — | — | — |
| Comparative Example 3 | D | D | C | D | D | C | — | — | — |
| Comparative Example 4 | C | D | C | C | C | C | — | — | — |

In conducting printing on a liquid-absorbing recording medium such as paper, the ink set of the invention enables to obtain images with a high quality without causing color blurring, feathering and color bleeding.

While the invention has been described in detail and with reference to specific examples thereof, it will be apparent to one skilled in the art that various changes and modifications can be made therein without departing from the spirit and scope thereof.

What is claimed is:

1. An ink set comprising at least two aqueous ink compositions each containing a dispersed pigment and a surfactant, said ink compositions including an ink composition having the lowest lightness and an ink composition having the highest lightness;
   wherein (1) said ink composition having the lowest lightness has a higher surface tension than those of other ink compositions;
   wherein (2) said ink composition having the highest lightness has a lower surface tension than those of other ink compositions; and
   wherein (3) the dispersed pigment contained in said ink composition having the lowest lightness and the dispersed pigment contained in said ink composition having the highest lightness are (3a) both anionic dispersed pigments or (3b) both cationic dispersed pigments,
   when condition (3a) is satisfied,
     (3a-i) said ink composition having the lowest lightness contains an anionic surfactant, and said ink composition having the highest lightness contains an amphoteric surfactant, or
     (3a-ii) said ink composition having the lowest lightness contains an amphoteric surfactant, and said ink composition having the highest lightness contains an anionic surfactant, and
   when condition (3b) is satisfied,
     (3b-i) said ink composition having the lowest lightness contains a cationic surfactant, and said ink composition having the highest lightness contains an amphoteric surfactant, or
     (3b-ii) said ink composition having the lowest lightness contains an amphoteric surfactant, and said ink composition having the highest lightness contains a cationic surfactant.

2. The ink set according to claim 1, wherein said ink composition having the lowest lightness is a black ink composition.

3. The ink set according to claim 1, wherein said ink composition having the highest lightness is a yellow ink composition.

4. The ink set according to claim 1, wherein said dispersed pigment in said ink composition having the lowest lightness and said dispersed pigment in said ink composition having the highest lightness are both anionic dispersed pigments.

5. The ink set according to claim 1, wherein said anionic surfactant has a sulfonic acid group.

6. The ink set according to claim 1, wherein said amphoteric surfactant has a sulfonic acid group.

7. The ink set according to claim 1, wherein the ink compositions, other than said ink composition having the highest lightness and said ink composition having the lowest lightness, each contain a nonionic surfactant.

8. The ink set according to claim 1, wherein said ink composition having the highest lightness has a surface tension of 20 mN/m or higher, and said ink composition having the lowest lightness has a surface tension of 50 mN/m or lower.

9. The ink set according to claim 1, comprising a yellow aqueous ink composition, a cyan aqueous ink composition, a magenta aqueous ink composition, and a black aqueous ink composition.

10. The ink set according to claim 9, wherein said yellow, cyan, magenta and black aqueous ink compositions have surface tensions satisfying the following relational expressions (1) and (2):

$$\gamma k > \gamma c > \gamma y \quad (1)$$

$$\gamma k > \gamma m > \gamma y \quad (2)$$

wherein γy, γc, γm and γk represent surface tensions of said yellow, cyan, magenta and black aqueous ink compositions, respectively.

11. The ink set according to claim 10, further satisfying the following relational expressions (3) and (4):

$$20 \ mN/m \leq \gamma y \quad (3)$$

$$\gamma k \leq 50 \ mN/m \quad (4).$$

12. An ink set consisting of a plurality of pigment-based aqueous ink compositions each containing a dispersed pigment and a surfactant, each of the pigment-based ink compositions having a different lightness with a first of said ink compositions having the lowest lightness and a second of said ink compositions having the highest lightness;
   wherein (1) said first ink composition having the lowest lightness has a higher surface tension than any other ink composition in the ink set;
   wherein (2) said second ink composition having the highest lightness has a lower surface tension than any other ink composition in the ink set; and
   wherein (3) the dispersed pigment contained in said first ink composition having the lowest lightness and the dispersed pigment contained in said second ink composition having the highest lightness are (3a) both anionic dispersed pigments or (3b) both cationic dispersed pigments,
   wherein, when condition (3a) is satisfied,
     (3a-i) said first ink composition having the lowest lightness contains an anionic surfactant, and said second composition having the highest lightness contains an amphoteric surfactant, or
     (3a-ii) said first ink composition having the lowest lightness contains an amphoteric surfactant, and said second composition having the highest lightness contains an anionic surfactant, and wherein, when condition (3b) is satisfied,
- (3b-i) said first ink composition having the lowest lightness contains a cationic surfactant, and said second ink composition having the highest lightness contains an amphoteric surfactant, or
- (3b-ii) said first ink composition having the lowest lightness contains an amphoteric surfactant, and said second ink composition having the highest lightness contains a cationic surfactant.

13. The ink set according to claim 12, wherein said first ink composition having the lowest lightness is a black ink composition.

14. The ink set according to claim 13, wherein said second ink composition having the highest lightness is a yellow ink composition.

15. The ink set according to claim 12, wherein the dispersed pigment in said first ink composition having the lowest lightness and the dispersed pigment in said second ink composition having the highest lightness are both anionic dispersed pigments.

16. The ink set according to claim 12, wherein said anionic surfactant has a sulfonic acid group.

17. The ink set according to claim 12, wherein said amphoteric surfactant has a sulfonic acid group.

18. The ink set according to claim 12, wherein the plurality of pigment-based ink compositions comprises other ink compositions containing a nonionic surfactant, wherein said first ink composition having the highest lightness and said second ink composition having the lowest lightness do not contain a nonionic surfactant.

19. The ink set according to claim 12, wherein said second ink composition having the highest lightness has a surface tension of 20 mN/in or higher, and said first ink composition having the lowest lightness has a surface tension of 50 mN/in or lower.

20. The ink set according to claim 12, comprising a yellow aqueous ink composition, a cyan aqueous ink composition, a magenta aqueous ink composition, and a black aqueous ink composition.

* * * * *